United States Patent Office 2,974,121
Patented Mar. 7, 1961

2,974,121

COATING COMPOSITIONS AND METHODS

George A. Salensky, Metuchen, N.J., assignor to A. Gusmer, Inc., Hoboken, N.J., a corporation of New Jersey No Drawing. Filed Apr. 1, 1960, Ser. No. 19,142

11 Claims. (Cl. 260—47)

This application is a continuation-in-part of application Serial No. 624,490, filed November 27, 1956, and now abandoned.

The present invention relates to coating compositions and methods, and more particularly to compositions and methods for applying a thermosetting synthetic resin of the epoxide type on a solid substrate at room temperature so as to produce a coating having a glossy exposed surface. In this connection, the invention is to be sharply distinguished from the use of epoxide resins as adhesives or as bonding agents, in which case there is no resin-air interface, and hence, no problem of producing a glossy surface. The present invention is concerned with coating on a solid substrate so as to leave one surface of the coating exposed; although it will be understood that the coating might later be stripped from the substrate to obtain a self-supporting film, without departing from the scope of the invention.

The plastic coating art has long been confronted with the problem of producing glossy epoxide coatings with amine hardening agents. Most of the amine hardening agents heretofore known to the art having been incompatible with epoxide resins to such a degree that the hardening agent would "sweat out" on the surface of the resin during air-curing at room temperature, leaving a hazy, dull finish known to the art as "amine blush." Upon subsequent baking at elevated temperature to improve the hardness of the coating previously set at room temperature, the unreacted amines on the surface of the coating oxidize, degrade, volatilize, and possibly form internal condensates, with the result that a permanently dull, flat finish is obtained on the exposed surface of the coating.

Moreover, under conditions of high humidity, the amines of the prior art form hydrates which are even less compatible with the resins that the unhydrated amines and further increase the degree of sweating out and amine blush.

There is nothing new in the curing of epoxide resins with amine hardeners at room temperature, as such. The difficulty has been that the prior art amines adapted to produce an air cure also produce an amine blush. Amine blush can be avoided by curing at elevated temperatures, above about 120° F.; but this requires that the coating be applied in an oven or that the substrate be deposited in an oven immediately after application of the coating. This has heretofore precluded the successful deposition of glossy coatings over large areas, and in any case has greatly increased the cost of coating. Therefore, the special utility of the present invention will be apparent, inasmuch as it enables the application of decorative waterproof coatings over large areas and the application of waterproof, chemically resistant, glossy, easily cleaned coatings on the interior of large containers for liquids and solids such as storage tanks, chemical processing equipment, and bulk transportation facilities such as tank cars, tank trucks, barges and ships, and many other uses which will suggest themselves to those skilled in the art.

Certain amine hardeners, among them some of the polyamino benzenes, do not produce amine blush at any temperature; but they also do not cure an epoxide resin on a solid substrate at room temperature. They cure only at elevated temperatures above about 200° F.

In a nutshell, then, the dilemma of the prior art was that the amines which cure at room temperature produce amine blush; while the amines which do not produce a blush do not cure at room temperature.

Attempts were made to avoid amine blush during room temperature curing by the use of amine alcohols, with the hope that the hydroxyl thereby introduced would render the amino groups compatible with the resin. However, these hydroxyl groups also spoiled the water resistance of the cured resin, with the result that these curing agents were a failure.

Although the above and many other attempts have been made to overcome the foregoing and other difficulties and disadvantages, none, so far as is known, has been entirely successful when practiced commercially on an industrial scale.

It has now been found that amine blush in epoxide resin coatings cured at room temperature can be avoided by the use of amine curing agents which actually change in nature during the curing process of cross-linking, and which have a structural form during the initial stages of crosslinking which is both compatible with the resin and hydrophobic, but which have a changed structural form during the later and final stages of cross-linking which imparts a high degree of water resistance to the cured resin.

Accordingly, it is an object of the present invention to provide coating compositions and methods for use in the production of cured glossy water-resistant coatings on solid substrates at room temperature.

Another object of the invention is the provision of cured glossy water-resistant coatings on solid substrates at room temperature.

A further object of the invention is the provision of hydrophobic amine curing agents for use with epoxide resin coating compositions.

Still another object of the present invention is the provision of coating compositions comprising epoxide resins having amine hardeners, which will cure quickly at room temperature.

The invention also contemplates articles coated with these novel coating compositions.

Other objects and advantages of the present invention will become apparent from a consideration of the following description:

Broadly stated, the present invention comprises compositions and methods for curing diglycidyl ethers of dihydric phenols at room temperature, by the use as a curing agent of an adduct of a polyamine having alkyl-bonded amino groups and a phenol having at least one monohydroxyphenyl group per molecule, the compounds having certain compositions and proportions relative to each other within ranges set forth below.

RESIN FORMULATION

The resins in connection with which the improved methods and curing agents of the present invention are to be used are the epoxide resins which are liquid at room temperature, and which are therefore suitable for use as coating compositions applicable by spraying, brushing, roller coating, or the like, on solid substrates such as metal, concrete, wood, paper, cloth, ceramics, glass fiber or the like, the substrates being at room temperature. Of course, practically any epoxide resin can be rendered liquid at room temperature by the use of solvents; but the disadvantages of using such solvents are the danger of fire and explosion, the danger of toxicity of solvents released as vapors during application, the limitation of film thickness applied during multiple coat applications because of solvent entrapment and resulting blistering upon baking to remove entrapped solvents, and the fact that solvents retained in the film detract from the physical properties and chemical resistance of the coating.

Therefore, the resins of this invention are those which consist essentially of diglycidyl ethers of dihydric phenols. The term "dihydric phenols" is defined as those aromatic compounds which have no more nor less than two phenolic hydroxyl groups per molecule, which may be in one nucleus, or in the same or different nuclei of fused ring systems, or in different ring systems attached directly to each other or by chains composed of one or more atoms, in which case the chains should be free from elements which interfere with the reaction of the phenolic hydroxyl groups with the glycidyl-forming groups such as epihalohydrins or glycol dihalohydrins. Examples of dihydric phenols within the invention are pyrocatechol, resorcinol, hydroquinone, the dihydroxy-naphthalenes such as 1,5 and so on, the dihydroxy-anthracenes such as 1,5 and so on, and the polynuclear phenols such as bisphenol A (predominantly 4,4'-dihydroxydiphenyldimethylmethane, with lesser quantities of the 2,2'- and 4,2'- isomers present), dihydroxybenzophenones, such as 4,4', dihydroxydiphenyls such as 4,4', bis(4-hydroxyphenyl) sulfone, and 2,2'-dihydroxy 1,1'-dinaphthyl methane. Particularly preferred, however, is bisphenol A. The presence of substituents such as halogens on the rings is not detrimental.

The diglycidyl ethers comprising the resins of this invention may be made by the processes described in U.S. Patent No. 2,506,486 to Bender et al., May 2, 1950.

In practice, it is virtually impossible to obtain a pure diglycidyl ether within the above definition; and hence, the term "consisting essentially" as used in connection with this ether is defined as permitting the inclusion thereof of minor proportions of materials such as polyepoxides which do not alter the essential operative characteristics of the ether for purposes of this invention. For example, the molecular weight of the diglycidyl ethers of bisphenol A is about 340; but the most common commercial form of this resin has an average molecular weight of about 390, and indeed, the average molecular weight may rise to about 440 by virtue of polyepoxide inclusions and the like, before the resin becomes undesirable for purposes of this invention.

It will also be understood that mixtures of resins within the invention may also be used with no decrease in effectiveness. Thus, it is within the scope of the invention to use a mixture of which no single component comprises more than a minor proportion of the whole, provided that the sum of the components consists essentially of resins within the invention.

THE AMINE HARDENER

The amine-type hardeners of the present invention consist of polyamines having neither less than one nor more than two active amine hydrogens on each of a plurality of alkyl-bonded amino groups per molecule, so that the nitrogen of the amino groups is bonded to one or two substituent aliphatic carbons or carbon chains, all three amine positions being occupied by carbon or active hydrogen. By "active hydrogen" is meant a hydrogen directly linked to a nitrogen; and such hydrogens are active relative to the epoxide groups of the resin, as will be explained later. The polyamines may be straight or branched chain, and may include aryl substituents so long as the amine requirements recited above are satisfied in the aliphatic portion of the molecules.

The operative embodiments of polyamines according to this invention are found in every major group of industrially available polyamines except the aryl polyamines such as the polyamino benzenes, naphthalenes, anthracenes and the like, in which the amino groups are bonded to unsaturated rings. The term "alkyl-bonded," however, does not exclude all cyclic polyamines. For example, the piperazines are both cyclic and operative, for the amino groups are alkyl-bonded even though the compounds themselves are non-alkyl. Also, the invention comprehends many polyamines having aryl substituent groups. Hence, it must be appreciated that the invention is not limited to alkyl polyamines in which the amino groups are alkyl-bonded.

Examples of amines within the invention include poly lower alkyl polyamines such as diethylenetriamine, dipropylenetriamine, triethylenetetramine, tetraethylenepentamine, heptaethyleneoctamine, hexapropyleneheptamine, dibutylenetriamine, and the above and other such polyamines having halogen or hydroxyl or other functional groups.

A desirable family of amines within the invention is produced by forming adducts of the above amines and a portion of resin according to the invention. Preferably, the resin is the same as will later be cured by the adduct, so that the adduct will have maximum compatibility with the resin proper; but it is to be understood that any resin or mixture of resins within the scope of the invention may be used to form the adduct, and that that adduct may subsequently be used to cure any other resin or mixture of resins within the scope of the invention. Obviously, the amine must be present in substantial excess of that amount required to cross-link the resin, and hence, the adduct in practice will comprise a mixture of unreacted amine and adduct proper, with substantially no unreacted resin. Those resinous adducts are advantageous, since they comprise in effect partially aromatic amines which however, will effect a cure at room temperature, and thus conform the structure of the amine somewhat to that of the resin to be cured, thereby improving the compatibility of the resin and the amine hardener therefor. Moreover, the formation of the adduct reduces the number of primary amino groups present per molecule, and thereby renders the amines more stable. Finally, the adduct displays reduced hygroscopicity, improved cross-linking properties, and reduced vapor pressure, as compared with the corresponding unreacted amines alone.

The mechanism of resinous adduct formation is thought to be that the ether oxygen bond of an epoxide group is broken by an active hydrogen of a primary amino group, with the formation of a hydroxyl group on one of the two carbons originally vicinal to the ether oxygen, and the linkage of the nitrogen directly to the other of the two vicinal carbons to form a secondary amino group. In the absence of primary amino groups, or after the primary groups are used up, the reaction proceeds with secondary amino groups, which then become tertiary amino groups and are not further reactive in the invention although they have a catalytic effect to be described later. Adduct formation may proceed at temperatures between about 40 degrees F. and about 300 degrees F., depending on the volatility of the amine. The preferred temperature range is about 125 to about 150 degrees F. to keep the reaction under control and still keep the reaction time relatively short.

Also among the amines within the invention are those polyamides which are the condensation products of polycarboxylic acids such as succinic acid, adipic acid and azelaic acid and poly lower alkyl polyamines proper such as those recited above. Condensation proceeds according to molar equivalents based on the carboxylic radical; for example, in the case of the dicarboxylic acids recited above, two mols of amine are required per mol of acid. Also included are polyamides derived from polymerized fatty acids, that is, the so-called dimer and trimer acids, Further amines within the invention are relatively long chain aliphatic diamines such as 1,6-hexanediamine, 1,7-heptanediamine, 1,8-octyldiamine, 1,9-nonyldiamine, 1,10-decyldiamine, and so on. Among the operative cyclic polyamines are piperazine, 2,5-dimethylpiperazine and 1,4-bis(3-aminopropyl) piperazine. The operative amines having aryl substituents include, in addition to the resinous adducts described above, m-xylylene diamine and m-phenylene dibutyldiamine. M-xylylene diamine has alkyl-bonded amino groups because the amino groups are at the two methyl positions.

At present, m-xylylene diamine is the particularly preferred embodiment of the invention.

Although the presence of hydroxyl groups in the amine is permissible, as noted above, hydroxylated amines should nevertheless be used with discretion. It has been found that the reactivity of the hydroxyl groups of short-chain hydroxylated amines with the epoxide groups of the resin is relatively low, and that a high concentration of unreacted hydroxyls tends to decrease the water resistance of the coating. It has also been found that this tendency is substantially avoided when long-chain hydroxylated amines are used, in which the hydroxyl group is positioned away from the amino groups, and that the reactivity of the amine hydroxyl varies inversely with its proximity to the amino groups, particularly the primary amino groups. Therefore, if short-chain hydroxylated amines are used, it is preferred to use them in admixture with non-hydroxylated amines.

As also with the resin, the amine may comprise a mixture of various amines according to the invention.

It has been found that the above amines should be used only within certain limits defined by the chemical composition thereof. Specifically, it has been found that the suitability of the amine for purposes of this invention varies according to the equation $$\frac{A}{B}=C \qquad (I)$$

where A is the number of mols of amine multiplied by the molecular weight of the amine, B is the number of mols of active hydrogen in the amine, and C is a dimensionless number between about 20 and about 60, and preferably between about 35 and about 40. In the preferred range of about 35 to about 40, the amines have optimum viscosity, set up time and resin compatibility. Below about 20, that is, in the case of amines such as ethylenediamine and dimethylenetriamine, the amines produce bubbling in the resin proper, induce very poor cross-linkage and produce varying results due to the volatility of the lower amines. Above about 60, the amines have a set up time and cure cycle at room temperature which is too long for practical purposes, and cross-link inadequately. Thus, the upper limit of about 60 automatically precludes the situation in which the ratio of resin to amine in the resinous adduct is so high that the adduct actually sets up; and hence, the resinous adduct will always be liquid, although at room temperature it may be a rather viscous liquid.

It should be noted that certain amines such as ethylenediamine and dimethylenetriamine, which by themselves are useless, as indicated by their low C values, are nevertheless useful in the invention in the form of resinous adducts, as described above, if their C values fall within the useful range.

The amount of amine used may vary widely, depending upon the particular properties of the resin and also upon the properties desired in the cured coating. In general, however, the amount of hardener used will be from about 6 to about 14 percent by weight of the resin to be cured, preferably about 10 percent, based on the weight of amine in the curing agent, and exclusive of the phenol in the curing agent. As indicated above, the amine and the resin to be cured may vary widely as to molecular weight and as to the number of active hydrogens per molecule of amine. From a theoretical standpoint, therefore, it might seem logical to correlate the maximum and minimum and optimum proportions of amine and resin relative to each other in terms of ratios of mols of resin to mols of active hydrogen. In actual practice, however, it has been found that the above weight ratios give optimum physical properties of the cured resin, rather than the molar ratios, theoretical considerations to the contrary notwithstanding.

THE PHENOLS

The phenols used in connection with the curing agent and which are useful in this invention are those phenols which have at least one monohydroxyphenyl group per molecule. Those phenols which have only polyhydroxyphenyl groups, such as resorcinol, hydroquinone, phloroglucinol, etc., when used as the only phenol, invariably result in a cured resin having a dull finish, and are therefore useless for purposes of this invention. Examples of phenols useful in the invention are phenol (monohydroxybenzene), o-, m- and p-cresol, p-tertbutylphenol, bisphenol A, the dihydroxybenzophenones and dihydroxydiphenyls and dihydroxydibenzyls recited above in connection with a resin, the monohydroxy naphthalenes, the isomers of bromophenol and chlorophenol, p-sec-butylphenol, 3,5-xylenol, the isomers of dodecylphenol, and 8-p-hydroxyphenyl-15-m-hydroxyphenyl pentadecane. At the border line are polyhydroxyphenols having the hydroxyls in different nuclei of fused ring systems, such as 1,5-dihydroxynaphthalene; but these compounds yield only a semi-gloss, and are considered to be of little use, if any, in the invention. Therefore, the term "monohydroxyphenyl group" is defined as excluding those monohydroxy nuclei which are fused to another nucleus or nuclei having a hydroxyl group or groups. As with the resin and amine, so also mixtures of phenols may be used.

It is the presence of monohydroxyphenyl groups, and not the absence of polyhydroxyphenyl groups, that renders the phenol useful. Thus, a phenol having both a monohydroxyphenyl group and a polyhydroxyphenyl group, such as 4-monohydroxyphenyl 2′,4′-dihydroxyphenyl dimethyl methane, is useful, provided the monohydroxyphenyl group, taken alone, is present in sufficient quantities as set forth below. Thus, the mere presence of polyhydroxy groups does not render useless a phenol which qualifies otherwise; but it should be noted that too great a concentration particularly of the higher polyhydroxy groups will discolor the resin due to degradation of the higher hydroxyls during curing, and in extreme cases may reduce compatibility with the resin and reduce gloss.

It has been found that the effective hydroxyl of the phenol should be present within certain limits as to molar amounts, and that these limits vary directly with the molar amount of resin to be cured and inversely with the nature of the amine as represented by the value C in Equation I. The explanation of the inverse variation with C is that the lower the C value of an amine, the greater is its incompatibility and hygroscopicity, and hence, the greater the phenol requirement. Thus, $$F=\frac{DE}{C} \qquad (II)$$

where C is the same as defined in connection with Equation I, D is a dimensionless number between about 10 and about 50, preferably about 17, E is the number of mols of resin to be cured, and F is the mols of monohydroxyphenyl hydroxyl in the phenol. Combining Equations I and II, it will be seen that the critical operative relationships of the invention are controlled by the equation $$\frac{A}{B}=C=\frac{DE}{F} \qquad (III)$$

With regard to the range of values of D, it has been found that below about 10, amine blush results. Above about 50, the reaction is incomplete to such a degree that the unreacted phenol in the reaction mixture impairs the physical properties and the chemical and water resistance of the coating to an undesirable degree.

AMINE-PHENOL ADDUCT

The heart of the present invention is the formation of an adduct between the above amines and phenols. This may be done simply by thoroughly admixing amines and phenols within the scope of the invention, in proportions which will satisfy both the requirements of amine as empirically determined with reference to the resin to be cured, and the requirements of phenol as determined on a mol basis with reference to the resin, as described above. Within these limits, all proportions of amine and phenol relative to each other are operative; and hence, the proportions of amine and phenol relative to each other, as such, are not critical.

Adduct formation may be carried out at temperatures between about 40 degrees F. and about 220 degrees F., preferably about 125 degrees F. Inasmuch as adduct formation may be effected at room temperature without the addition of heat, and inasmuch as it appears that some chemical combination actually occurs, the product is properly referred to as an "adduct," as those skilled in the art of amines will understand.

That the product is more than a mere mixture, the components of which have a synergistic effect on each other, is evidenced by the fact that upon mixing, an exothermic effect is observed which raises the temperature of the components to around 170–180° F., depending on the batch size. In addition, a definite increase in viscosity is noted over that which would result if only a mere physical mixture had taken place. However, the combinative mechanism is unknown; although it is possible that a coordination complex or an amine addition salt might be formed. In any event, the resultant adduct is a mixture of the reacted amine-phenol and unreacted amine or unreacted phenol.

It is this latter adduct which is used as the final curing agent, and which is added to the resin to be cured, in such proportions as will satisfy Equation III. In intimate admixture with the resin, this final adduct is compatible and does not sweat out. This compatibility is thought to be due to the fact that the amino groups of the combined portion of the adduct are somehow altered as to their nature or effect, and in general rendered more hydrophobic, but with no decrease in desirable cross-linking properties. The result of this compatibility is a glossy exposed surface on the resin after it has cured on a solid substrate at room temperature.

It is also this adduct which undergoes a change in nature during curing. Intitially, the phenol appears to be closely tied to the amine. Apparently, however, this is an equilibrium reaction which reverses as amine is consumed during cross-linking, releasing the phenol, which then acts as a free reagent and links to the resin at unreacted ether oxygen positions, thus rendering the cured resin highly water-resistant, as will be explained more fully below.

It is essential that this adduct be formed prior to its use as the curing agent.

PROCEDURE

The amine-phenol adduct is added to and thoroughly mixed with the resin to be cured, and acts as a curing agent therefor at room temperatures, that is, from about 40 to about 100 degrees F., preferably about 70 to about 100 degrees F. Resins having including curing agent according to the invention have a relatively short pot life, that is, a relatively short useful life during which they retain their free-flowing characteristics before they partially set up to a viscid mass which though still a liquid, can be used as a coating composition only with the greatest difficulty and which is therefore useless for commercial purposes involving the rapid application of a smooth coating of uniform thickness to a solid substrate. Therefore, application by spraying is preferred, which enables separate introduction of the resin and curing agent into the mixing chamber of a spray gun and the immediate discharge of the mixture in the form of a homogeneous spray onto the solid substrate to be coated. Thus, by spraying, substantially all of the set up time of the resin is passed on the substrate, the set up time being the interval between mixing of the resin and curing agent and the point during the cure cycle when the applied coating is no longer tacky to the touch.

Heating of the resin and curing agent prior to application to the substrate is not necessary to the invention; and in any case, the curing resin will assume the room temperature of the substrate within 15 seconds to 2 minutes after application. Hence, the remarkable utility of the present invention will be clear; for, although there are amine curing agents known to the prior art which will set up above 120 degrees F. without the formation of haze, there were none known before the present invention which would cause a resin within the invention to set up at room temperature without haze. However, it may be desirable to heat the resin and curing agent for the purpose of adjusting the viscosity for ease of application, inasmuch as many of the resins according to the invention have a consistency at room temperature about that of honey.

The flow characteristics of the sprayed resin may also be adjusted by the use of small proportions of a flow control agent, such as 1% by weight of any of a variety of silicones, to prevent cratering of the resin on the substrate. However, this forms no part of the present invention.

The following formulae and equations are of necessity fragmentary and incomplete and not at all proportionate, but they indicate some of the various reactions that proceed during curing at room temperature.

Taking as reagents a diglycidyl ether of a dihydric phenol such as bisphenol A, which will be represented by the formula

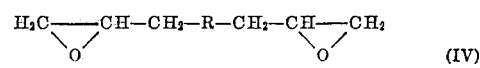

(IV)

where R is the residue of the dihydric phenol after etherification, and a polyamine according to the invention, in this instance a lower alkyl diprimary polyamine such as diethylenetriamine, which will be represented for simplicity by the formula $$H_2N\text{---}X\text{---}NH_2 \qquad (V)$$

where X is the substituent containing the alkyl group or groups to which the amino groups are bonded, and a phenol according to the invention, in this instance monohydroxybenzene, the resinous amine adduct, if used, could be represented by the fragmentary formula

(VI)

The formation of the amine-phenol adduct proceeds generally as follows:

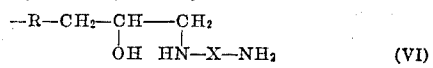

(VII)

or if the resinous amine is used, as follows:

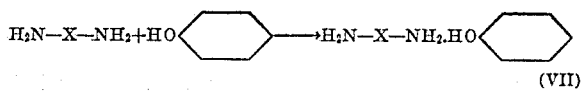

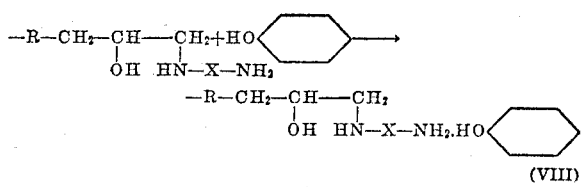

(VIII)

If the curing agent which is the product of Equation VII is used in admixture with the resin to be cured, it is compatible with the resin until it is actually linked thereto, and the equilibrium of Equation IV is reversed, as per the following partial equation:

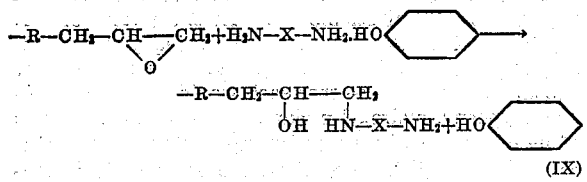

This is thought to be the primary cross-linking mechanism of curing in the present invention. However, there is also the further reaction of the newly-freed phenol with other unreacted epoxide positions, as follows:

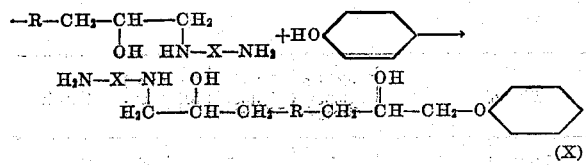

This latter reaction is catalyzed by the presence of secondary and tertiary amino groups.

Equations IX and X could but need not be repeated to illustrate use of the product of Equation VIII, since the reactions are essentially the same.

The reactions according to Equations IX and X probably occur in that same sequence initially, but after a very short time they proceed simultaneously, until one depletes the supply of epoxide groups, or the active hydrogens of the amine, or the monohydroxyphenyl hydroxyls. As will be well understood by those skilled in this art, these reactions never really go to completion, but simply come to rest when the mobility of the reagents is sufficiently reduced by cross-linking.

As has been indicated above, these mixtures of resin and curing agent according to the invention set up, and the reactions come to rest, at room temperature. However, the degree of cross-linking and hence the hardness of the cured resin, can be increased by subsequently baking the coating at elevated temperature, if desired. This further treatment comprising heating the resin after application to the substrate forms no part of the present invention. The present invention is concerned only with coating compositions that set up at room temperature, regardless of subsequent treatment, if any.

Thus, it will be seen that by the present invention, a high proportion of hydroxyl groups is present during the initial stages of curing; and this factor is believed to account in large measure for the compatibility of the curing agent with the resin during this critical initial stage. On the other hand, it will also be seen that as curing proceeds, these hydroxyl groups are largely used up to form phenolates and phenyl ethers, which impart water resistance to the cured resin. It is to this dual nature of the curing agent, during the initial and later stages of curing, that the present invention owes its success.

For the purpose of giving those skilled in the art a better understanding of the invention, the following illustrative examples are given:

Example 1

To illustrate the formation of a resin-amine adduct, an epoxide resin was chosen which consisted essentially of diglycidyl ether of bisphenol A, but which included minor proportions of polyepoxides and the like in such amounts as would not alter the essential operative characteristics of the pure diether for purposes of this invention. The resin had a melting point of about 10 degrees C., a viscosity of 12,400 centipoises at 25 degrees C., a specific gravity at room temperature of 1.1676, an epoxy value of 0.52 as measured by the pyridinium chloride method, a hydroxyl value of 0.08 as measured by the lithium aluminum hydride method, an esterification value of 1.25, an epoxide equivalent (weight of resin per equivalent of epoxide) of about 195, and an average molecular weight of about 390. It was sold commercially by the Shell Chemical Corporation as "Epon 828." To 3.5 grams of this resin, 5.0 grams of diethylenetriamine were added and stirred at 72 degrees F. At first, a slight exothermic effect was noticed; but after 120 minutes, the mixture had returned to 72 degrees F. Apparently, the reaction at room temperature was around 75% complete in about 2 hours and was complete in not over 24 hours. The product was a mixture of the unreacted diethylenetriamine and the resinous amine of Formula VI, and had a viscosity of 7000 centipoises at 72 degrees F.

Referring now to Equation I, the value of C for the unreacted diethylenetriamine was calculated, on the basis of five active hydrogens per molecule, as 20.63. To find the value of C for the adduct, it is seen that 5 grams of the amine is 5/103.15 or 0.0485 mol of amine, multiplied by 5 active hydrogens per molecule, or 0.243 mol of active hydrogen. From this must be substracted the mols of hydrogen used in adduct formation, which will be seen from Formula VI to equal 3.5/195 (the epoxide equivalent) or 0.018. Thus, 0.225 is the mol of active hydrogen present in the mixture; and (3.5 plus 5.0)/0.225 is the value of C, or 37.8.

Example 2

Example 1 was repeated, but the amine used was 5.0 grams of triethylenetetramine. The product had a viscosity at 72 degrees F. of 10,000 centipoises. The C value was 45.3.

Example 3

Example 1 was repeated, but the amine used was 5.0 grams of tetraethylenepentamine. The product had a viscosity at 72 degrees F. of 14,000 centipoises. The C value was 51.

Example 4

To the 8.5 grams of product of Example 1, 5.0 grams of monohydroxybenzene were added and thoroughly stirred at 72 degrees F. A slight exothermic effect was observed, and the mixture returned to 72 degrees F. in 80 minutes. Apparently, the reaction at room temperature was around 75% complete in about 1 hour and was complete in not over 24 hours. The product, which was a mixture of the resinous amine-phenol adduct of Formula VI and unreacted resinous amine, had a viscosity at 72 degrees F. of 8,500 centipoises.

Example 5

Example 4 was repeated, but with the product of Example 2. The final product had a viscosity at 72 degrees F. of 12,250 centipoises.

Example 6

Example 4 was repeated, but with the product of Example 3. The final product had a viscosity at 72 degrees F. of 15,000 centipoises.

Example 7

The 13.5 grams of product of Example 4, the curing agent, was heated to 185 degrees F., at which temperature it had a viscosity of 1 or 2 centipoises, about that of water; and 46.5 grams of the resin described in Example 1 was heated to 250 degrees F., at which temperature it had about the same viscosity as the curing agent. The two were thoroughly mixed together and a portion of the mixture was immediately sprayed on the sandblasted surface of a steel plate ⅛ inch thick at 72 degrees F. Spraying was effected by the use of a spray gun of the type disclosed in Patent No. 2,890,836, June 16, 1959. The coating averaged about 0.008 inch thick. The plate and its coating did not measurably depart from 72 degrees F., due to the weight of the plate and the cooling effect of the air through which the mixture was sprayed. The coating on the plate set up in one hour and 35 minutes. The unused remainder of the resin had a pot life of 6 minutes. The coating on the plate was quite glossy as sprayed and remained so thereafter. No haze or dullness or sweating out of the hardener was visible. The next day, the coated plate was baked for one hour at 210 degrees F. and there was no change in the glossy finish nor other harmful effect. The plate was immersed in boiling water for 24 hours, also with no change nor harmful effect.

Referring now to Equation II, the value for C is 37.8 as computed above, and the value of E, computed on the basis of the epoxide equivalent, which is the grams of resin containing one gram equivalent of epoxide, is 46.5/2×195, or 0.119. The factor of 2 is introduced because there are two mols of epoxide per mol of diether.

F, the mols of monohydroxyphenyl hydroxyl, in this case, is the same as the mols of monohydroxybenzene, 5/94.1, or 0.532. In the case of a polynuclear phenol, the mols of hydroxyl are the mols of phenol multiplied by the number of monohydroxyphenyl nuclei per molecule; for example, in the case of bisphenol A, the mols of hydroxyl are twice the mols of phenol. Thus, substituting in Equation II, the value of D is found to be 16.9.

*Example 8*

Example 7 was repeated, except that the product of Example 5 was used in place of that of Example 4. The results were the same as in Example 7, except that the set up time was one hour and 45 minutes.

*Example 9*

Example 7 was repeated, except that the product of Example 4 was used in place of that of Example 7. The results were the same as in Examples 7 and 8, except that the set up time was one hour and 50 minutes.

*Example 10*

For the sake of comparison, to illustrate the vital function of the phenol in the curing agent, Example 7 was repeated, but with the product of Example 1 in place of that of Example 4. In other words, the phenol was left out entirely. The value of F in Equation 2 is zero; and hence, the value of D is also zero. As soon as the resin was applied to the plate, the process of sweating out was visible to the unaided eye in the form of haze, or amine blush. The set up time was five hours; and by that time, the coating had a flat, dull finish which was not improved upon baking. The pot life was 32 minutes. Thus it will be observed that, in addition to accomplishing the primary purpose of assuring a glossy exposed surface on the coating, the novel curing agents and methods of the present invention also greatly shorten the set up time of room temperature cures.

*Examples 11–28*

Examples 11 through 28 are the same as Example 7, except that various amounts of different phenols were used at the stage of Example 4. Thus, the value of C is constant at 37.8 throughout the following group of examples, as is the value of E at 0.119. The quantities of phenol were selected so that each would have the monohydroxyphenyl hydroxyl molar equivalent of the 5 grams of monohydroxybenzene of Example 7; and hence, F is constant at 0.0532. Therefore, the value of D is constant at 16.9, so that a good comparison of the effect of various phenols within the invention and outside the invention is obtained. The results of the examples are presented in tabular form for brevity.

| Example | Phenol | Weight of Phenol, Grams | Set Up Time, Minutes | Pot Life, Minutes | Finish |
|---|---|---|---|---|---|
| 11 | p-tert-butyl phenol | 7.96 | 72 | 7 | Glossy. |
| 12 | bisphenol A | 6.06 | 50 | 6 | Do. |
| 13 | p-bromophenol | 9.16 | 58 | 4 | Do. |
| 14 | m-chlorophenol | 6.83 | 68 | 4 | Do. |
| 15 | o-chlorophenol | 6.83 | 72 | 5 | Do. |
| 16 | p-sec butylphenol | 7.96 | 97 | 7 | Do. |
| 17 | p-chlorophenol | 6.83 | 70 | 4 | Do. |
| 18 | m-cresol | 5.73 | 72 | 5 | Do. |
| 19 | pyrocatechol | 2.93 | 175 | 6 | dull. |
| 20 | hydroquinone | 2.93 | 300 | 10 | Do. |
| 21 | p-cresol | 5.73 | 78 | 6 | glossy. |
| 22 | 3,5-xylenol | 6.46 | 125 | 5 | Do. |
| 23 | pyrogallol | 2.24 | 281 | 13 | dull. |
| 24 | resorcinol | 2.93 | 300 | 7 | Do. |
| 25 | α-naphthol | 7.65 | 90 | 5 | glossy. |
| 26 | 1,5-diphdroxynaphthalene | 4.25 | 70 | 6 | semigloss. |
| 27 | 8-p-hydrosyphenyl-15-m-hydroxphenyl pentadecane. | 10.9 | 170 | 14 | glossy. |
| 28 | mixed isomers of dodecylphenol | 13.9 | 170 | 14 | Do. |

From the above, the effectiveness of phenols within the invention will be clear. Example 26 is considered to be outside the invention; and of course, Examples 19, 20, 23 and 24 are clearly outside the invention.

*Example 29*

Example 7 was repeated, but instead of 5.0 grams of monohydroxybenzene, 2.5 grams of monohydroxybenzene plus 1.4 grams of hydroquinone were used. Thus, the total hydroxyl was the same as in Example 7, but only half of it was in monohydroxyphenyl form, so that the value of D is 8.5, which is not sufficient, as shown by Equation II. The resulting coating had a dull to semi-gloss finish.

*Example 30*

Example 29 was repeated, but without the hydroquinone. The same results were obtained and the same dull to semi-gloss finish resulted, the only difference between the two coatings being that that of 29, containing hydroquinone, was darker than that without the hydroquinone, evidently due to the degradation of the hydroquinone. Otherwise, it will be seen by comparison of Examples 29 and 30 that the presence or absence of polyhydroxyphenyl phenols makes no difference to the finish of the exposed surface of the coating.

*Examples 31–41*

Example 7 is repeated, but instead of the product of Example 4, varying amounts of various polyamines are used in connection with 5.0 grams of monohydroxybenzene. In certain of the following examples, however, the phenol is omitted, to demonstrate the criticality of the amine-phenol adduct as compared to the amine alone. As in the case of Examples 11–28, the quantities of the polyamines are selected so as to keep the values of the variables of the control equation essentially constant among the various examples within the scope of the invention, thereby to afford a valid comparison of the merits of the different polyamines. As before, the results are presented in tabular form for brevity.

| Example | Polyamine | Weight of Polyamine, Grams | Phenol Used | Set Up Time, Minutes | Pot Life, Minutes | Finish |
|---|---|---|---|---|---|---|
| 31 | piperazine | 9.0 | no | 60 | 5 | dull. |
| 32 | do | 9.0 | yes | 60 | 4 | glossy. |
| 33 | 1,6 hexanediamine | 7.0 | no | overnight | 60+ | dull. |
| 34 | do | 7.0 | yes | 120 | 10 | glossy. |
| 35 | 1,10 decyldiamine | 10.0 | no | overnight | 60+ | dull. |
| 36 | do | 10.0 | yes | 130 | 12 | glossy. |
| 37 | m-xylylene diamine | 8.0 | no | 120 | 60 | dull. |
| 38 | do | 8.0 | yes | 70 | 10 | glossy. |
| 39 | m-phenylene diamine | 7.0 | no | | 300 | Do.[1] |
| 40 | do | 7.0 | yes | 240 | 35 | Do.[2] |
| 41 | m-phenylene dibutyldiamine | 14 | yes | 80 | 10 | Do. |

[1] But soft and tacky.
[2] But very brittle, thermoplastic.

The amine of Example 41 is simply a higher alkyl form of the amine of Examples 37 and 38, which is the preferred embodiment.

The results of Examples 39 and 40 require some explanation. Superficially, it might seem that results within the present invention were obtained because the final coatings of these two examples were glossy. Actually, however, no cure was effected in either case. In the case of Example 39, in which no phenol was used, the coating remained soft and tacky to the touch. In the case of Example 40, the coating hardened but did not cure; instead it merely became quite brittle and was very weak, much in the manner of cooled sugar candy. Also in the manner of sugar candy, it became plastic again when warmed above room temperature, so that within the range of room temperature and somewhat above, the composition is thermoplastic rather than thermosetting. At around 200° F. or so, the compositions of Examples 39 and 40 would cure with a glossy finish, but not at room temperature, for the polyamine is a polyamino benzene of the type mentioned near the beginning of this specification, in which the amino groups are aryl-bonded rather than alkyl-bonded.

Thus, Examples 32, 34, 36, 38 and 41 are within the invention, while Examples 31, 33, 35, 37, 39 and 40 are outside the invention.

From all of the foregoing, it will be obvious that all of the initially recited objects of the invention have been achieved.

Although the present invention has been described in conjunction with preferred embodiments, it will be understood that modifications and variations thereof may be made without departing from the spirit of the invention, as will be understood by those skilled in the art. Such modifications and variations are considered to be within the purview and scope of the invention and the appended claims.

What is claimed is:

1. Coating compositions curing at room temperature to produce a glossy water-resistant coating on a solid substrate, consisting essentially of a diglycidyl ether of a dihydric phenol and having admixed therewith as a hardening agent an adduct of (1) a polyamine more than one of whose nitrogen atoms are bonded to non-aryl carbon and have neither less than one nor more than two active amine hydrogens per nitrogen atom and (2) a phenol having per molecule at least one benzene ring bearing only one hydroxyl group, thereby to form a coating composition, said adduct being present in an amount sufficient to promote curing of said composition, said ether and adduct having compositions and proportions related by the equation $$\frac{A}{B}=C=\frac{DE}{F}$$

where A is the molecular weight of said polyamine times the number of mols thereof, B is the mols of said hydrogen, C is a dimensionless number between about 20 and about 60, D is a dimensionless number between about 10 and about 50, E is the mols of said ether, and F is the mols of monohydroxyphenyl hydroxyl in said adduct phenol.

2. Coating compositions as claimed in claim 1, in which the value of C is between about 35 and about 40.

3. Coating compositions as claimed in claim 1, in which the value of D is about 17.

4. An article having an exposed surface thereof coated with a composition according to claim 1.

5. A method of forming a cured glossy water-resistant coating on a solid substrate at room temperature, comprising in combination the steps of adding, to a diglycidyl ether of a dihydric phenol, an adduct of (1) a polyamine more than one of whose nitrogen atoms are bonded to non-aryl carbon and have neither less than one nor more than two active amine hydrogens per nitrogen atom and (2) a phenol having per molecule at least one benzene ring bearing only one hydroxyl group, thereby to form a coating composition, said adduct being present in an amount sufficient to promote curing of said composition, and thereafter depositing said composition on a said substrate, said ether and adduct having compositions and proportions related by the equation $$\frac{A}{B}=C=\frac{DE}{F}$$

where A is the molecular weight of said polyamine times the number of mols thereof, B is the mols of said hydrogen, C is a dimensionless number between about 20 and about 60, D is a dimensionless number between about 10 and about 50, E is the mols of said ether, and F is the mols of monohydroxyphenyl hydroxyl in said adduct phenol.

6. A method as claimed in claim 5 in which the value of C is between about 35 and about 40.

7. A method as claimed in claim 5, in which the value of D is about 17.

8. An article having an exposed surface thereof coated according to a method as in claim 5.

9. Coating compositions as claimed in claim 1, in which the polyamine is m-xylylene diamine.

10. An article as claimed in claim 4, in which the polyamine is m-xylylene diamine.

11. A method as claimed in claim 5, in which the polyamine is m-xylylene diamine.

References Cited in the file of this patent

UNITED STATES PATENTS

| | | |
|---|---|---|
| 2,506,486 | Bender et al. | May 2, 1950 |
| 2,510,885 | Greenlee | June 6, 1950 |
| 2,615,008 | Greenlee | Oct. 21, 1952 |
| 2,651,589 | Shakal et al. | Sept. 8, 1953 |